H. R. REYNOLDS.
SHAFT HANGER BEARING.
APPLICATION FILED APR. 1, 1919.
1,326,892.
Patented Dec. 30, 1919.
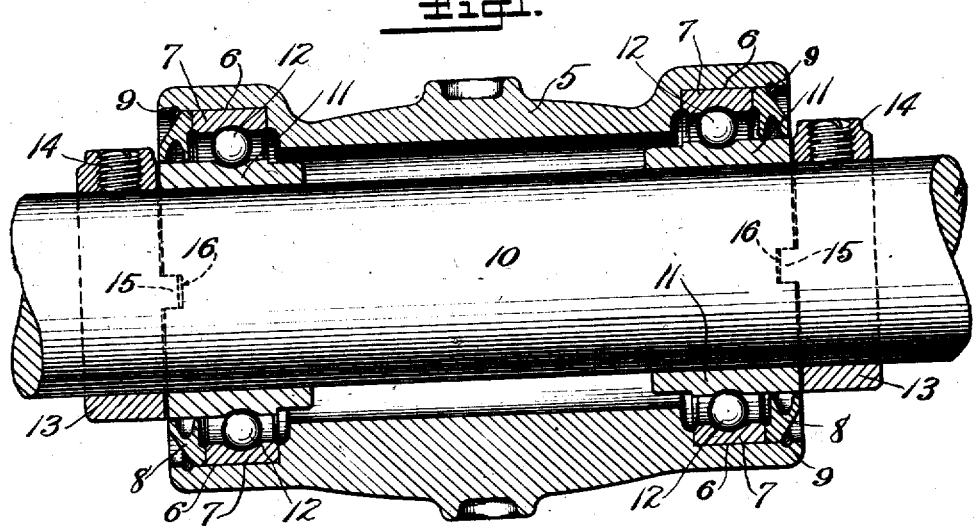
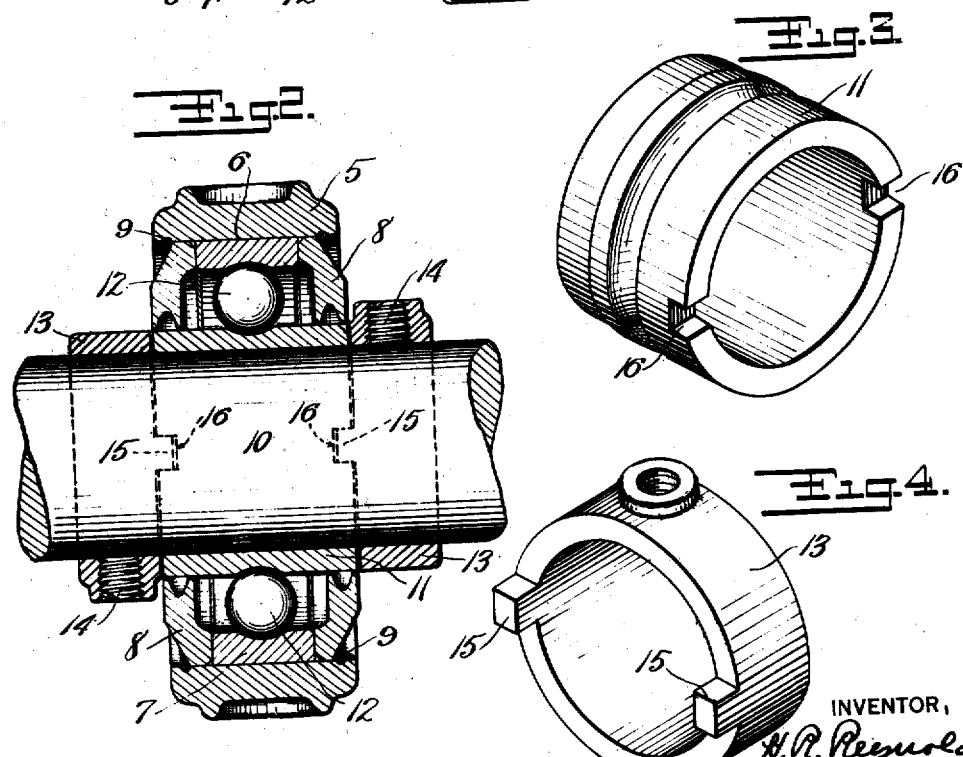
INVENTOR,
H. R. Reynolds,
BY
ATTORNEY

UNITED STATES PATENT OFFICE.

HARRY R. REYNOLDS, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

SHAFT HANGER-BEARING.

1,326,892.  Specification of Letters Patent.  Patented Dec. 30, 1919.

Application filed April 1, 1919. Serial No. 286,653.

*To all whom it may concern:*

Be it known that I, HARRY R. REYNOLDS, a citizen of the United States of America, residing at New Britain, Connecticut, have invented a new and useful Shaft Hanger-Bearing, of which the following is a specification.

My present invention relates to shaft bearings and aims to provide a relatively simple and efficient form of shaft hanger bearing which to a certain extent will be self-adjusting and which will be entirely practical and desirable in other respects.

Briefly the invention comprises the combination with the hanger box and the shaft, of a race ring or rings loosely engaged on the shaft coöperating with a corresponding race ring or rings mounted in the box and an abutment collar or collars fixedly engaged on the shaft to limit the longitudinal movement of the inner race ring or rings and having keying shoulders interlocking with the race ring or rings longitudinally of the shaft in such a way as to permit the desired limited self-adjustment of the parts.

Other features of the invention will appear as the specification proceeds.

In the accompanying drawing I have illustrated the invention embodied in different practical forms, but with the understanding however that other modifications may be made to suit requirements without departure from the true spirit and scope of the invention.

In said drawing:—

Figure 1, is a longitudinal sectional view of a double row bearing with the shaft shown broken away at its opposite ends.

Fig. 2, is a similar view of a single row bearing.

Figs. 3 and 4 are perspective views of one of the inner race rings and one of the abutment collars used in the first form of the invention.

Referring to the various parts in detail, 5 designates the hanger box constructed to fit the usual hanger bracket and provided in this disclosure with annular seats 6 in its opposite end portions to receive the outer race rings 7. These outer race rings may be secured in place in various ways as by means of the dust rings 8 which are shown secured to their seats by the spring locking rings 9.

10 designates the shaft and 11 the inner race rings. These inner race rings fit relatively loosely on the shaft and suitable roller elements such as the balls 12 are engaged between the opposed sets of inner and outer race rings. This loose fit of the inner race rings on the shaft enables the bearing to be adjusted longitudinally on the shaft as a unit, the box in its entirety simply being slid along the shaft to the position where it will properly fit in the hanger bracket.

After the proper relative adjustment of the hanger box and shaft is effected, the inner race rings are secured in said longitudinally adjusted position on the shaft and are keyed against rotary movement on the shaft by means of abutment collars 13 which are secured fast to the shaft at the ends of the inner race rings as by means of set screws 14. These abutment collars by providing abutments for the inner race rings prevent longitudinal shifting of the box and shaft and the keying of the race rings on the shaft is effected in this particular disclosure by providing the abutment collars with lugs 15 projecting longitudinally from the abutment end of the collar into engagement with the longitudinal notches 16 in the abutment face of the inner race ring. This construction, it will be apparent, will allow for a certain amount of longitudinal movement of the bearing ring on the shaft without unkeying the ring from the shaft. The parts may be set up with a slight space intervening between the abutment faces of the inner race rings and adjoining abutment collars as indicated at 17, so as to positively provide for this longitudinal self-adjustment of the parts.

The construction illustrated in Fig. 2 is generally similar to that described except that in this case the bearing is of the single row type. In this construction the inner race ring 11 is held in longitudinally adjusted position on the shaft by abutment collars 13 secured fast to the shaft at the opposite ends thereof and provided with longitudinally engaging keying shoulders 15 and 16 as before described.

My invention, it will be seen, provides for the easy assemblage of the bearing and relative adjustment of the bearing and shaft, allows for further adjustment of the parts at any time to suit conditions and at the same time permits of a limited degree of self-adjustment which is very desirable in bearings of the hanger type.

Furthermore it will be noted that in my invention both the radial load and the thrust of the shaft is taken by the balls, friction being thereby reduced to a minimum.

I claim:—

1. In a shaft bearing, the combination with a shaft, of a hanger box for the same, outer race rings seated in the opposite ends of said box, inner race rings loosely engaged on the shaft opposite the outer race rings, roller elements between said inner and outer race rings and abutment collars fixedly engaged on the shaft at the ends of the inner race rings and spaced therefrom, said abutment collars and inner race rings having interlocking keying elements engaging substantially longitudinally of the shaft to enable limited longitudinal self-adjustment of the bearing elements.

2. In a shaft bearing, the combination with a shaft, of a hanger box for the same, outer race rings seated in the opposite ends of said box, inner race rings loosely engaged on the shaft opposite the outer race rings, roller elements between said inner and outer race rings and abutment collars fixedly engaged on the shaft at the ends of the inner race rings and spaced therefrom, the abutting portions of said abutment collars and inner race rings having longitudinally extending lugs and notches engaging substantially longitudinally of the shaft whereby to key the race rings on the shaft and at the same time provide for limited longitudinal self-adjustment of the bearing elements.

3. In a shaft bearing, the combination with a shaft, of a hanger box for the same, an outer race ring seated in the box, an inner race ring loosely engaged on the shaft opposite the outer race ring, roller elements engaged between the outer and inner race rings and an abutment collar arranged to be fixedly engaged on the shaft for endwise engagement with the inner race ring, said abutment collar and inner race ring having interlocking keying elements on their adjacent faces engaging longitudinally of the shaft to thereby enable limited longitudinal self-adjustment of the hanger box on the shaft.

4. In a shaft bearing, the combination of a hanger box, an outer race ring seated in said box, a ring member engaging the end of said race ring to position the same in the box, a securing ring engaging said ring member to secure the same in such holding position, an inner race ring engageable loosely over the shaft for which the bearing is designed, a series of roller elements interposed between the outer and inner race rings and an abutment collar provided with means for adjustably securing the same on said shaft in close proximity with one end of the inner race ring but spaced therefrom, abutting faces of said collar and inner race ring having keying shoulders engaging longitudinally of the shaft to enable limited longitudinal self-adjustment of the parts.

5. In a shaft bearing, the combination of a hanger box having seats in its opposite ends, outer race rings secured in said seats, separate inner race rings opposed to the outer race rings, a series of balls engaged between each pair of outer and inner race rings, said parts being constructed to carry both radial and thrust loads between the hanger box and inner race rings, said inner race rings being constructed to fit loosely over the shaft for which the bearing is designed and abutment collars provided with means for securing the same fixedly on said shaft, said collars and inner race rings having interlocking shoulders at their adjacent ends engaging longitudinally of the bearing to enable automatic limited self-adjustment of the bearing and shaft parts.

6. In a shaft hanger bearing, the combination of a hanger box provided with a ball race-way therein, a shaft within said hanger box, a sleeve mounted on said shaft with sufficient looseness to slide longitudinally thereon to a limited extent, said sleeve having a companion ball race-way, with balls arranged in said race-ways, means for holding said sleeve against independent rotary motion on said shaft while still permitting limited endwise movement thereon, said means comprising two collars fixed on said shaft at opposite ends of said bearing and spaced slightly apart therefrom to permit said limited endwise movement and a key engagement between at least one of said collars and said sleeve to prevent said independent rotary motion.

7. A combination like that of claim 6, wherein ball races and sleeves are provided at the opposite ends of the hanger box and a keying collar is provided for each sleeve.

HARRY R. REYNOLDS.